United States Patent Office 3,301,919
Patented Jan. 31, 1967

3,301,919
BLEND OF PARTICULATED POLYVINYL CHLO-
RIDE, AND A TERPOLYMER OF METHYL METH-
ACRYLATE, ETHYL ACRYLATE, AND GLYCID-
YL ACRYLATE
Harry Joseph Cenci, Warminster, and Louis Charles Sou-
der, Levittown, Pa., assignors to Rohm & Haas Com-
pany, Philadelphia, Pa., a corporation of Delaware
No Drawing. Filed Apr. 21, 1964, Ser. No. 361,575
5 Claims. (Cl. 260—836)

This invention relates to polymeric compositions comprising methyl methacrylate, ethyl acrylate and glycidyl methacrylate and to blends of the polyvinyl chloride resins with these polymers.

In the manufacture of rigid polyvinyl chloride it is essential that the resin go through a fluxing step after which the resin is processed to the desired shape. During processing the resin must yield under stress, have adequate flow properties and lend itself to milling and extrusion. It must also remain stable at the processing and fluxing temperatures. Since polyvinyl chloride alone does not possess these properties, it has been necessary to add various processing aids to the resin. Conventional processing aids have been inadequate to satisfy all the processing requirements of polyvinyl chloride. Some processing aids are cross-linked and insoluble in the polyvinyl chloride, others are not adequately compatible under condtions of use of the polyvinyl chloride and generally all polyvinyl chloride processing aids have sharply detracted from the performance properties of the rigid polyvinyl chloride. In particular, they generally detract from the polyvinyl chloride's resistance to distortion under high temperature. The processing aids of the invention are non-crosslinked copolymers; they are solvent-soluble, such as in toluene. Also, they are characterized by the fact that at least 85%, especially at least 90%, of the theoretical epoxy group, is intact in the polymer. The polymer is compatible with the polyvinyl chloride and capable of forming smooth sheets. It also imparts to the polyvinyl chloride the requisite thermal stability.

The copolymers of this invention comprise three main monomeric ingredients that are copolymerized into a non-crosslinked copolymer. The monomers are methyl methacrylate, ethyl acrylate, and glycidyl methacrylate. Their respective proportion is in the range of 20 to 98.5; 0.5 to 40; and 1 to 40 percent by weight. The preferred ranges are 45 to 90; 5 to 35; and 5 to 20 percent by weight. The molecular weight of the polymers ranges from 150,000 to 2,000,000, of which the range of 300,000 to 1,500,000 is preferred.

The ratio of methyl methacrylate and glycidyl methacrylate to ethyl acrylate is from 60–40 to 99.5 to 0.5. A characteristic which suits the polymer for certain applications particular well is its particle size. It is advantageous that no more than 30% of the copolymer be retained on a 200-mesh screen. For certain applications like hot roll calendering and extrusion application it is desirable that no more than 10% of the copolymer be retained on a 100-mesh screen.

In physical appearance the copolymer is of particulated granulated particles that are uneven and solid (not hollow). Another type polymer that is especially well suited for certain applications is made of particles that are hollow and spheroidally shaped. The viscosity of the copolymer is A to Z–10 on the Gardner-Holdt scale (a 10% solution in toluene), the preference being D to Z–2.

The copolymers of the invention may be made by a variety of methods. One suitable method is by bulk polymerization of the monomeric ingredients. In accordance with that process a suitable amount of monomers is mixed with an addition polymerization catalyst, such as azobis-isobutyronitrile, at a temperature sufficient to cause polymerization such as in the range of 25°–100° C. or higher. Another suitable method for making the copolymer of the invention is by an aqueous dispersion method. In that procedure the necessary copolymerizable monomers are polymerized as an emulsion in the presence of a suitable emulsifying agent such as sodium dodecylbenzene sulfonate, and the resulting polymer is recovered by a suitable method.

The polyvinyl chloride compositions of the invention comprise the copolymer in amounts sufficient to give satisfactory processing aid. Generally, this amount is kept to a minimum, consistent with the benefits desired. In practice, an amount in the range of 0.5 to 10% by weight of the polyvinyl chloride is generally adequate, although sometimes it may be desirable to increase the amount of copolymer to amounts beyond 10%, such as 25% or more. Amounts smaller than 0.5% may also be employed when the benefits are adequate for the purposes intended.

By using the copolymer, there is formed a blend of a polyvinyl chloride which is an extrudable, millable, and workable plastic composition. A smooth, flexible polyvinyl chloride sheet is formed during processing by the use of the terpolymer which upon cooling gives a rigid polyvinyl chloride which is a homogeneous blend of the polyvinyl chloride and the terpolymer. This composition exhibits excellent thermal stability. It also has very good light stability. Moreover, the composition has retained an unusually high heat distortion temperature.

In the polyvinyl chloride compositions of the invention there may be used in addition to the copolymer additional conventional materials such as fillers, dyes, pigments and stabilizers. The copolymers may be the sole processing aid employed, but they may be used in conjunction with other conventional materials.

The examples which are provided below are merely illustrative of the invention. All parts are by weight. The following abbreviations are used: MMA for methyl methacrylate, EA for ethyl acrylate, and GMA for glycidyl methacrylate.

Example 1

In a 3-liter, 3-necked flask equipped with a stirrer and nitrogen inlet tube, a thermometer and a reflux condenser, there are charged the following: 8 parts of sodium dodecylbenzene sulfonte, 640 parts methyl methacrylate, 80 parts ethyl acrylate, 80 parts glycidyl methacrylate, and 1560 parts of water.

A slow stream of nitrogen is bubbled through the stirred emulsion. There is then added 8 parts of 34.9% hydrogen peroxide and 3.2 parts of sodium formaldehyde sulfoxolate dihydrate dissolved in 25 parts of water. The temperature of the reaction mixture rises from 23° to 76° C. As the reaction diminishes and the temperature decreases to 64° C. the reaction mixture is cooled with an ice bath. The pH of the emulsion at the end of the polymerization is adjusted from 2.9 to 8 by the addition of 1% sodium hydroxide.

The emulsion is then spray-dried to give 761 parts of a fine, white, free-flowing powder, of which 75% goes through a 200 screen mesh. The particles in the powder have the appearance of minute, cracked eggshells; they are "egg-shaped," hollow, and curved particles. The powder has a Gardner-Holdt viscosity (10% in toluene) of T–U and an oxirane content of 1.07. The copolymer has the following composition: MMA 80 parts/EA 10 parts/GMA 10 parts.

Example 2

Example 1 is repeated, changing the glycidyl methacrylate amount to 5 parts, the EA amounts to 10 parts, and the MMA amounts to 85 parts. A terpolymer is obtained having MMA 85 parts/EA 10 parts/ and GMA 55 parts.

Example 3

Following the procedure of Example 1, the respective proportions of the copolymer are changed to give a terpolymer of the following composition: MMA 70 parts/ EA 10 parts/GMA 20 parts.

Example 4

There are mixed with 0.4% of azobisisobutyronitrile 640 parts of MMA, 80 parts of EA, and 80 parts of GMA. The mix is polymerized in a suitable container until all the monomer has polymerized. The bulk polymer is then ground to a suitable particle size.

Example 5.—Incorporation of stabilizing processing aid into polyvinyl chloride The following ingredients are dry-blended at low speed in a Waring Blendor for two minutes: polyvinyl chloride, 90 parts; terpolymer processing aid, 10 parts, and a barium cadmium stabilizer, 3 parts. After dry-blending, the samples are milled on a two-roll mill at 350° F. After 6 minutes on the mill, the processing properties are checked. They are reported below. The thermal stability of the sample is determined by placing samples (1" x ½" x 40 mils) in an oven at 350° F. and removing them at periodic intervals. Initial color, time to definite discoloration, and time to char are recorded in Table I.

TABLE I

| | |
|---|---|
| Processing aid | MMA/EA/GMA |
| Composition | 80/10/10 |
| Gardener-Holdt viscosity | T–U |
| Thermoplasticity | Good + |
| Release | Excellent |
| Rolling bank | Good + |
| Processing time (to optimum in minutes) | 1½ |
| Hot strength | Good + |
| Hours to definite discoloration | ¾ |
| Hours to char | 5 |

It is evident that the terpolymer has excellent processing properties combined with excellent thermal stability properties. Its heat distortion temperature at 264 p.s.i is 72° C. by the ASTM–D–648–56 test.

The processing aids of this invention may be used in conjunction with a plasticized polyvinyl chloride composition in which there are incorporated such plasticizers as di(2-ethylhexyl)phthalate, dioctylphthalate, various phosphonate plasticizers, polyesters, diesters, epoxy plasticizers such as epoxidized soybean oil, and the like.

We claim:

1. An extrudable, millable blend of particulated polyvinyl chloride and 0.5–25% by weight based on the weight of the polyvinyl chloride of a non-crosslinked copolymer comprising methyl methacrylate, ethyl acrylate, and glycidyl methacrylate wherein the percentage by weight of methyl methacrylate, ethyl acrylate and glycidyl methacrylate is in the range of 98.5 to 20, 0.5 to 40, and 1 to 40, respectively, and wherein at least 90% of theoretical epoxy group is intact, and said copolymer having a molecular weight in the range of 150,000 to 2,000,000.

2. A homogeneous composition comprising a linear copolymer consisting essentially of methyl methacrylate, ethyl acrylate and glycidyl methacrylate, in which the percentage by weight of each monomer is 98.5 to 20, 0.5 to 40, and 1 to 40, respectively, blended with polyvinyl chloride, said copolymer having a molecular weight range of 150,000 to 2,000,000, and said composition having a high resistance to distortion under high temperature and having high thermostability, said copolymer being present in an amount of 0.5 to 25% by weight based on the weight of the polyvinyl chloride.

3. The composition of claim 2 in which there is incorporated a plasticizer for the polyvinyl chloride.

4. The composition of claim 2 in which the percentage by weight of each monomer is 84 to 76, 8 to 12, and 8 to 12, respectively, said copolymer being present in an amount by weight of 0.5–10% based on the weight of the polyvinyl chloride.

5. A process which comprises blending polyvinyl chloride with 0.5–25% by weight, based on the weight of the polyvinyl chloride, of a copolymer comprising methyl methacrylate, ethyl acrylate and glycidyl methacrylate, wherein the percentage by weight of methyl methacrylate, ethyl acrylate, and glycidyl methacrylate is in the range of 98.5 to 20, 0.5 to 40, and 1 to 40, respectively, and said polymer has a molecular weight range of 150,000 to 2,000,000.

References Cited by the Examiner

UNITED STATES PATENTS 3,201,497  8/1965  Heino _____ 260—836

MURRAY TILLMAN, Primary Examiner.

P. LIEBERMAN, Assistant Examiner.